United States Patent [19]

Iwamura et al.

[11] Patent Number: 5,715,354
[45] Date of Patent: Feb. 3, 1998

[54] IMAGE DATA REGENERATING APPARATUS

[75] Inventors: Ryuichi Iwamura, Tokyo; Makoto Kawamura, Kanagawa, both of Japan

[73] Assignee: Sony Corporation, Tokyo, Japan

[21] Appl. No.: 499,909

[22] Filed: Jul. 11, 1995

[30] Foreign Application Priority Data

Jul. 12, 1994 [JP] Japan .................. 6-159789

[51] Int. Cl.⁶ .......................... H04N 5/91; H04N 5/917
[52] U.S. Cl. ................................. 386/68; 386/109
[58] Field of Search ........................ 386/68, 7, 8, 6, 386/27, 33, 70, 109, 111, 125; 369/60; H04N 5/91, 5/917

[56] References Cited

U.S. PATENT DOCUMENTS

| | | | |
|---|---|---|---|
| 5,270,828 | 12/1993 | Mogi | 386/101 |
| 5,305,113 | 4/1994 | Iwamura et al. | 386/68 |
| 5,471,450 | 11/1995 | Yonemitsu et al. | 369/60 |

*Primary Examiner*—Robert Chevalier
*Attorney, Agent, or Firm*—William S. Frommer; Alvin Sinderbrand

[57] ABSTRACT

The present invention is intended to enable smooth reverse regeneration of image data while minimizing a large-sized and expensive configuration of an apparatus according to the present invention. Compression-coded image data recorded on an optical disc 1 is regenerated and stored in a ring buffer 5. Image data stored in the ring buffer 5 is decoded in a decoding part 20. A control circuit 21 controls to store the image data necessary for decoding in the ring buffer 5 in terms of, for example, one GOP and repeatedly read the image data from the ring buffer 5 when it is necessary for reverse regeneration if reverse regeneration is commanded.

16 Claims, 12 Drawing Sheets

DISPLAYING ORDER

RECORDING ORDER (REGENERATION ORDER)

FIG. 5A SW1
FIG. 5B MEMORY 16a
FIG. 5C MEMORY 16b
FIG. 5D MEMORY 16c
FIG. 5E SW2
FIG. 5F DISPLAY

NORMAL (FORWARD DIRECTION) REGENERATION ← → REVERSE DIRECTION REGENERATION

SW1

MEMORY 16a

MEMORY 16b

MEMORY 16c

SW2

DISPLAY

REVERSE DIRECTION REGENERATION ←→ NORMAL (FORWARD DIRECTION) REGENERATION →

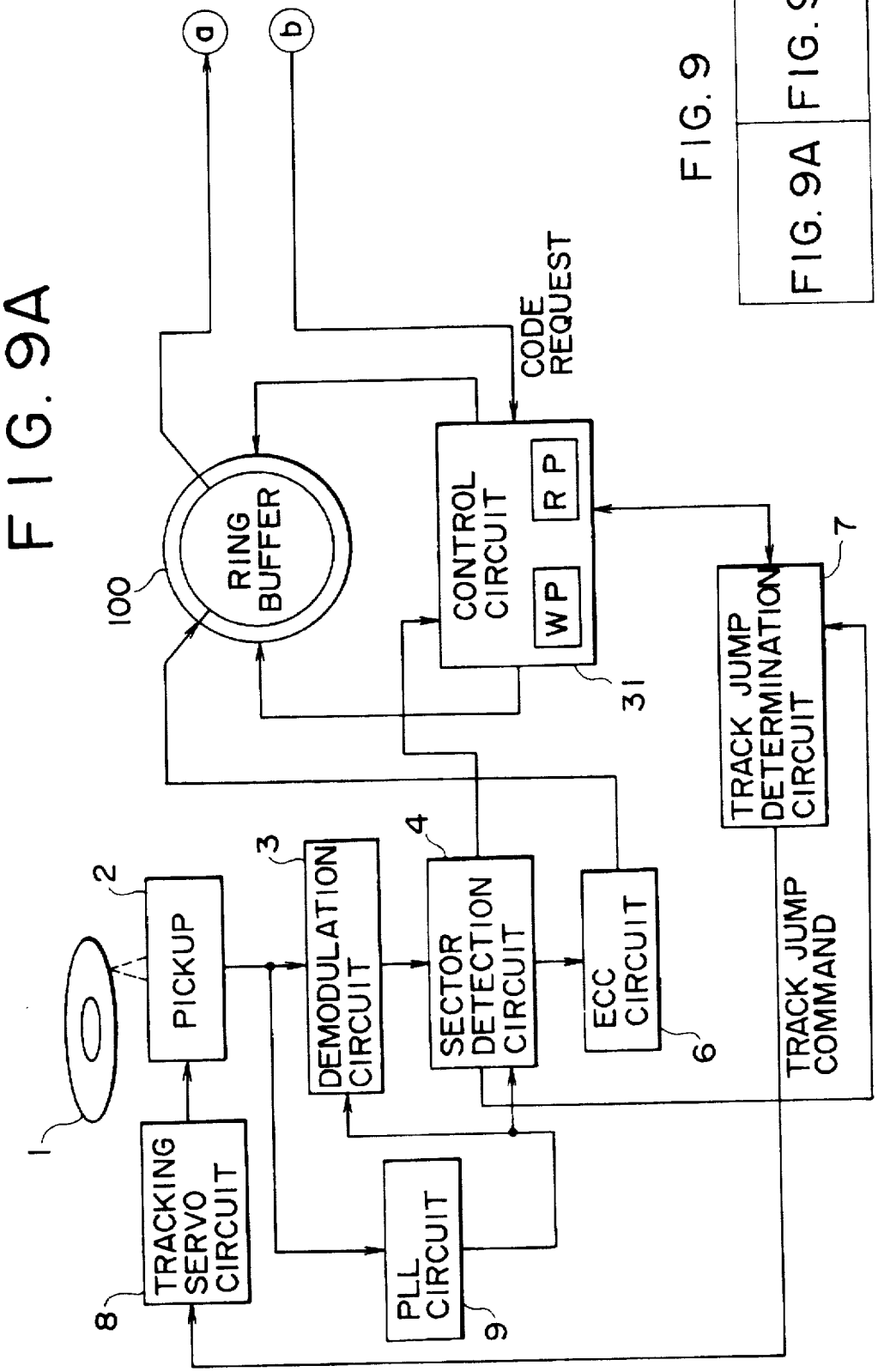

DISPLAYING ORDER

RECORDING ORDER (REGENERATION ORDER)

SW1

MEMORY 16a

MEMORY 16b

MEMORY 16c

SW2

DISPLAY

START OF GOP1 DECODING

IMAGE DATA REGENERATING APPARATUS

BACKGROUND OF THE INVENTION

1. Field of the Invention

The present invention relates to a data regenerating apparatus for regenerating predictively coded image data which is recorded, for example, in an optical disc, an optical magnetic disc or other recording medium.

2. Description of Related Art

An optical disc apparatus for regenerating dynamic image data which is recorded in recording media such as an optical disc or superposed with audio data by a predictive coding method such as, for example, MPEG conforming to the specified standard is disclosed in, for example, the specification and the drawings of the pending U.S. application Ser. No. 908,164 filed on Jul. 2, 1992 by the present inventor.

As shown in FIG. 9, in this optical disc apparatus, a pickup 2 irradiates a laser beam onto an optical disc 1 and the predictively coded image data stored in the optical disc 1 is regenerated from the reflected laser beam. The data outputted by the pickup 2 is entered into a demodulator circuit 3 and demodulated therein. The output of the pickup 2 is also entered into the phase-locked loop (PLL) circuit 9 and a clock is extracted. This clock is sent to the demodulator circuit 3 and a sector detection circuit 4. The data demodulated by the demodulator circuit 3 is entered into an ECC circuit 6 through the sector detection circuit 4 and an error is detected and corrected.

The sector detection circuit 4 detects a sector number (an address assigned to a sector of the optical disc 1) from the data demodulated by the demodulator circuit 3 and outputs it to a control circuit 31. If the sector detection circuit 4 fails to detect, for example, the sector number or the sector number which could be detected is not a serial number, the sector detection circuit 4 outputs a sector number abnormality signal to a track jump determination circuit 7.

The ECC circuit 6 detects a data error from the data supplied from the demodulator circuit 3 through the sector detection circuit 4 and corrects the error by using a parity bit (parity data) affixed to the data. In addition, the ECC circuit 6 generates an error occurrence signal to the track jump determination circuit 7 if the data error cannot be corrected. The data for which the error is corrected is supplied from the ECC circuit 6 to a ring buffer 100 for track jump and stored therein according to the control of the control circuit 31.

The control circuit 31 reads an address of each sector of the optical disc 1 from the output of the sector detection circuit 4 and designates a write address (write point (WP)) for storing the data from the ECC circuit 6 in the ring buffer 100 (writing in the ring buffer) corresponding to the address. The control circuit 31 designates a read address (regeneration point (RP)) for the data written in the ring buffer 10 according to a code request signal from a video code buffer 10 of a decoding part 20 in a following stage. Data from the regeneration point (RP) is read and supplied to the video code buffer 10 and stored therein.

Data stored in the video code buffer 10 is transferred to a reverse VLC circuit 11 according to a code request signal from the reverse VLC circuit 11 of the following stage. The reverse VLC circuit 11 processes the data entered in reverse VLC mode, outputs the data to the reverse quantization circuit 12 and a code request signal to the video code buffer 10 when reverse VLC processing of the data entered is completed, and requests input of new data. In addition, the reverse VLC circuit 11 outputs a quantization step size or a motion vector obtained as a result of reverse VLC processing to a reverse quantization circuit 12 or a motion compensation circuit 15, respectively.

The reverse quantization circuit 12 reversely quantizes data entered according to a quantization step size supplied from the reverse VLC circuit 11 and outputs the data to a reverse DCT circuit 13. The reverse DCT circuit 13 processes the data entered in a reverse DCT mode and supplies the data to an addition circuit 14.

If the data supplied from the reverse DCT circuit 13 to the addition circuit 14 is data of one picture, the data is directly outputted to a frame memory bank 16 through the addition circuit 14 and stored therein.

In this case, the frame memory bank 16 comprises switches SW1 and SW2 and three frame memories 16a to 16c, and the switch SW1 is adapted to select one of terminals a1, b1 and c1. The switch SW2 is adapted to select one of terminals a2, b2 and c2 as required. Consequently, an output of the addition circuit 14 is stored in one of frame memories 16a to 16c. Image data stored in one of frame memories 16a to 16c is outputted to a display 18 through a D/A converter 17.

If the data outputted from the reverse DCT circuit 13 is the data of P picture including I picture as a predictive image, the decoded data of one picture is read out from the frame memory bank 16 and supplied to the motion compensation circuit 15. The motion compensation circuit 15 compensates the data supplied from the frame memory bank 16 for a motion corresponding to a motion vector supplied from the reverse VLC circuit 11 to obtain the predictive image and supplies it to the addition circuit 14. The addition circuit 14 adds up the data outputted from the reverse DCT circuit 13 and the data outputted from the motion compensation circuit 15 to generate the data of P picture. The data is stored in the frame memory bank 16.

If the data outputted from the reverse DCT circuit 13 is the data of B picture, the decoded data of I or P picture is read out from the frame memory bank 16 and supplied to the motion compensation circuit 15. The data supplied to the motion compensation circuit 15 is compensated for motion and supplied to the addition circuit 14. The addition circuit 14 adds up the data outputted from the reverse CT circuit 13 and the data outputted from the motion compensation circuit 15 and therefore the decoded B picture data is obtained. The data is stored in the frame memory bank 16.

The image data decoded and stored in the frame memory bank 16 as described above is D/A-converted by a D-A converter 17, then supplied to the display 18 and displayed thereon.

FIG. 10 shows the relative positions of the write point (WP) and the regenerate point (RP) on a ring buffer 00. In FIG. 10, a circumference corresponds to the capacity of the ring buffer 100. The write point (WP) and the regenerate point (RP) are adapted so as to turn around on the ring buffer 10 in, for example, a clockwise direction. A quantity of data from the regenerate point (RP) to the write point (WP) in the clockwise direction is therefore a remaining quantity of data stored in the ring buffer 100 (quantity of stored data).

The maximum transfer rate of data from the ring buffer 100 to the video code buffer 10 is set at a value equal to or smaller than a data transfer rate from the ECC circuit 6 to the ring buffer 100. Accordingly, the write point (WP) rotates at a rotation rate higher than the rotation rate of the regenerate point (RP) and therefore the write point (WP) catches up the regenerate point (RP) and the data may overflow from the ring buffer 100.

As described above, the control circuit 31 supplies the data stored in the ring buffer 100 to the video code buffer 10 in response to a code request signal from the video code buffer 10. When processing of data regarding, for example, a simple image is continued and the quantity of data to be transferred from the video code buffer 10 to the reverse VLC circuit 11 decreases, the quantity of data to be transferred from the ring buffer 100 to the video code buffer 10 also decreases. In doing so, the quantity of data stored in the ring buffer 100 (remaining data quantity) increases and may overflow from the ring buffer 100.

The track jump determination circuit 7 therefore calculates (detects) a quantity of data currently stored in the ring buffer 100 from the write point (WP) and the regenerate point (RP) to be controlled by the control circuit 31 and, when the quantity of data exceeds a preset specified reference value, determines that the ring buffer 100 may overflow and outputs a track jump command to the tracking servo circuit 8.

When the track jump determination circuit 7 detects the sector number abnormality signal from the sector detection circuit 4 or the error occurrence signal from the ECC circuit 6, the track jump determination circuit 7 obtains a quantity of data remaining in the ring buffer 100 from the write point (WP) and the regenerate point (RP) which are controlled by the control circuit 3. In addition, a quantity of data is obtained to ensure reading from the ring buffer 100 to the video code buffer 10 (to prevent an underflow of the ring buffer 100) while the optical disc 1 rotates once from the current track position (while waiting for one rotation of the optical disc 1).

If the quantity of data remaining in the ring buffer 100 is sufficiently large, the underflow of the ring buffer 100 does not occur even though the data is read at the maximum transfer rate from the ring buffer 100 to the video code buffer 10. The track jump determination circuit 7 therefore determines that the error can be restored by regenerating again the error occurring position by the pickup 2 and outputs the track jump command to the tracking servo circuit 8.

When the track jump command is outputted by the track jump determination circuit 7, the tracking servo circuit 8 carries out the track jump of the regeneration position obtained by the pickup 2. In other words, in the case that, for example, the data is recorded from the internal periphery to the external periphery of the optical disc 1, the tracking servo circuit 8 makes the pickup 2 jump to an adjacent track from the current position. While the optical disc 1 rotates again once and reaches the original position, write operation of new data into the ring buffer 100 is inhibited while the regeneration point obtained by the pickup 2 becomes a sector number while the optical disc 1 rotates again once and reaches the original position, that is, the sector number obtained from the sector detection circuit 4 is track-jumped. In this while, the data stored in the ring buffer 100 is transferred, as required, to the video code buffer 10.

Specifically, only the regeneration point (RP) advances (rotates) on the ring buffer 100 (FIG. 10) and the write position (WP) remains stationary.

If the quantity of data stored in the ring buffer 100 exceeds the specified reference value even though the sector number obtained from the sector detection circuit after track jump 4 coincides with the sector number at the time of track jump, that is, the ring buffer 100 may overflow, write operation of data in the ring buffer 100 is not resumed and the track jump is carried out again.

When the sector number obtained from the sector detection circuit after track jump 4 coincides with the sector number at the time of track jump, the quantity of data stored in the ring buffer 100 is less than the specified reference value, and write operation of new data in the ring buffer 10 is started. In other words, the rotation of the write point (WP) is resumed.

In this case, the ring buffer 100 has a capacity capable of storing the data as much as at least one track of the optical disc 1 (one rotation).

If the optical disc 1 is, for example, a disc whose line speed is fixed (CLV), the rotation cycle is the maximum at the outermost periphery and therefore the optical disc 1 has at least a storage capacity for one track (one rotation) at the outermost periphery, that is, (rotation cycle of the outermost periphery)×a storage capacity of (data transfer rate from the ECC circuit 6 to the ring buffer 100).

As described above, the maximum transfer rate of data from the ring buffer 100 to the video code buffer 10 is set at a value equal to or smaller than the data transfer rate from the ECC circuit 6 to the ring buffer 100 and therefore the code request for data transfer from the video code buffer 10 to the ring buffer 100 can be outputted as desired regardless of the timing of the track jump.

As described above, since the optical disc apparatus is adapted to track-jump the pickup 2 corresponding to the storage capacity of the ring buffer 100, the overflow or the underflow of the video code buffer 10 is prevented regardless of complexity or flatness of the image regenerated from the optical disc 1 and an image of uniform quality can be regenerated for a long period of time.

In addition, this optical disc apparatus is adapted so that the pickup 2 is track-jumped to read again the data from the optical disc 1 when an error is caused in the data read from the optical disc 1, and therefore the regenerated image can be prevented from deterioration due to the data read error.

The motion prediction compensation method (predictive coding method) is used for image compression conforming to the MPEG. As shown in FIG. 11A, motion prediction of image data for which I, P and B pictures such as, for example, ..., B1, I2, B3, P4, B5, P6, B7, I8, ..., B19, I20, ... (numerals affixed to I, P and B indicate the sequence of display) is carried out as shown below.

In FIG. 11A, the B picture before the I picture to the P picture before the next I picture form GOP (Group Of Pictures). In FIG. 11 (same as in FIG. 4 described below), therefore, B1 to P6, B7 to P12 and B13 to P18 respectively form GOP and these GOPs are respectively referred to as GOP0 to GOP2.

In FIG. 11A, the arrow mark indicates that, in the case that the image data at the start point is assumed as the reference image (reference picture), a predictive image of image data at the end point is generated based on the motion vector. Accordingly, if GOP1 is particularly noted, for example, the predictive image of P10 is generated with I2 as the reference image. Also, for example, the predictive image of B9 is generated with one of I8 and P10 or both thereof as the reference picture.

In addition, for example, the predictive image of B7 of GOP1 is generated with one of I8 of GOP1 and P6 of GOP0 which is the preceding GOP or both thereof as the reference image.

For decoding the image obtained by the image compression coding method using the motion prediction compensation system, the reference image for the image need be already decoded and therefore the image data shown in FIG. 11A is recorded, for example, in the sequence shown in FIG. 11B for the recording medium such as the optical disc 1.

Specifically, when recording of GOP0 is finished and recording of GOP1 is carried out, I8 for recording of which the reference image is not used for decoding is first recorded and subsequently B7 which is decoded with I8 or P6 of GOP0 as the reference image is recorded. Subsequently, P10 which is decoded with I8 as the reference image is recorded and, after this, B9 which is decoded with I8 or P10 as the reference image is recorded. In addition, P12 which is decoded with P10 as the reference image is recorded, then B11 which is decoded with P10 or P12 as the reference image is recorded.

As described above, GOP1 for which the sequence of display is B7, I8, B9, P10, B11 and P12 is recorded in the sequence of I8, B7, P10, B9, P12, and B11.

In the optical disc apparatus shown in FIG. 9, the image data recorded in the optical disc 1 in the recording sequence as described above is, for example, decoded as described below. In other words, if it assumed that decoding of GOP1 is finished and decoding of GOP1 is started, I8 is first decoded in the decoding part 20 as described above and supplied from the addition circuit 14 to the fame memory bank 16.

In this case, it is assumed that, when GOP0 is decoded in the sequence of I2, B1, P4, B3, P6 and B5, P4, P6 and B5 of the above are stored respectively in memories 16a to 16c as shown in FIGS. 12B to 12D. FIGS. 12A to 12F (similarly, FIGS. 5 and 7 described later) respectively show the selection terminal of switch SW1, respective contents of storage of memories 16a to 16c, the selection terminal of switch 2, and the display image of the display 18 in terms of the time series.

In this case, as shown in FIG. 12A, the switch SW1 is changed over to the terminal a1 and consequently I8 from the addition circuit 14 is supplied to the memory 16a and stored therein (FIG. 12B).

Following I8, B7 is decoded as shown in FIG. 11B. Decoding of this B7 is carried out, as described above, by using I8 stored in the frame memory 16a (FIG. 12B) or P6 (FIG. 12B) which has already been decoded and stored in the frame memory 16b. Decoded B7 is supplied to the frame memory bank 16. In this case, the switch SW1 is changed over to the terminal c1 as shown in FIG. 12A and therefore B7 is stored in the frame memory 16c (FIG. 12D).

Moreover, in this case, the switch SW2 is changed over to the terminal c2 (FIG. 12E) and B7 stored in the frame memory 16c is displayed on the display 18 (FIG. 12F).

Following B7, P10 is decoded by using I8 (FIG. 12B) stored in the frame memory 16a (FIG. 11). The switch SW1 is changed over to terminal b1 (FIG. 12A) and therefore the decoded P10 is stored in the frame memory 16b (FIG. 12C). At this time, the switch SW2 is changed over to terminal a2 (FIG. 12E) and consequently I8 stored in the frame memory 16a is displayed (FIG. 12F).

After the above, B9 is decoded by using I8 (FIG. 12B) stored in the frame memory 16a or P10 (FIG. 12C) stored in the frame memory 16b. The switch SW1 is changed over to the terminal c1 (FIG. 12C) and B9 decoded thereby is stored in the frame memory 16c (FIG. 2D). The switch SW2 is changed over to the terminal c2 and consequently B9 stored in the fame memory 16c is displayed (FIG. 12F).

Subsequently, as shown in FIG. 12A, the switch SW1 is changed over and a decoded image is stored in the frame memories 16a to 16c, respectively, and, as shown in FIG. 12E, the switch SW2 is changed over and the images stored in the frame memories 16a to 16c are displayed on the display 18. In other words, as described above, the image data (FIG. 11B) recorded in the optical disc 1 in the sequence of I8, B7, P10, B9, P12 and B11 are decoded in this order and displayed in the original sequence of B7, I8, B9, P10, B11 and P12 (FIG. 11A).

However, for regenerating the optical disc 1 in which the image data is recorded in the sequence shown in FIG. 1B in the reverse direction (reverse regeneration), that is, for displaying the image data in the sequence of, for example, P12, B11, P10, B9, I8, B7, P6, . . . from P12 of GOP1 on the display 18, there has been a problem that the access to the optical disc is frequently required and it is difficult to carry out smooth reverse regeneration.

From the above description, it is know that P10 is necessary for decoding, for example, P12 and I8 is required to obtain P10. For decoding B11 which is the preceding timing (preceding in the sequence of display) frame to P12, P10 and P12 are required. Accordingly, for decoding P12, P10 and I8 need be regenerated from the optical disc 1 in addition to P12 and, for decoding B11 after P12, P12, P10 and I8 need be regenerated from the optical disc 1 in addition to B11.

For reverse regeneration as described above, I or P picture recorded in the optical disc 1 is required before the image to be regenerated. For decoding, the same data should be repeatedly regenerated by frequently accessing to the optical disc 1.

It is therefore considered to provide a frame memory bank 16, which has a large capacity, for example, several times a capacity comprising the frame memories 16a to 16c for approximately three frames as described above, and store therein a number of decoded image data, which will be used as the reference images. Preferably, it is ideal if decoded data of one GOP can be stored. However, it has been a problem that the apparatus would be large-sized and expensive if a memory capable of storing a number of image data is used as the frame memory bank 16 since there would be a large quantity of image data after decoding.

SUMMARY OF THE INVENTION image data regenerating means according to the present invention comprises regenerating means for regenerating coded image data including a plurality of predictively coded image data from a recording medium, storing means for storing regenerated coded image data, decoding means for decoding coded image data read out from the storing means, output means for outputting decoded image data in a sequence of regeneration, and read control means for carrying out reverse regeneration by repeatedly reading coded image data, which will be a predictive reference image for predictive coded image data and requires a plural number times of decoding, from the storing means and supplying the image data to the decoding means.

In this image data regenerating apparatus, the recording medium can be a disc type. The output means has means for storing decoded image data of a plurality of frames.

Further, this image data regenerating apparatus has write control means for controlling write operation of coded image data into the storing means and can maintain the coded image data in the storing means with the write control means until decoding of all coded image data of one GOP is finished.

The write control means controls write operation to write the coded image data of one GOP to be decoded into the storing means until decoding of all coded image data of one GOP to be decoded next is finished.

The present invention made in view of the above-described problem is intended to minimize a tendency of larger-sized and expensive configuration of the apparatus and ensure smooth reverse regeneration.

In the data regenerating apparatus of the above configuration, predictively coded image data, which is recorded in an optical disc 1, is regenerated and stored in a ring buffer 5. The image data stored in the ring buffer 5 is decoded in the decoding part 20. A control circuit 21 makes the ring buffer 5 store the image data in terms of, for example, one GOP necessary for decoding and repeatedly reads out the image data from the ring buffer 5 when the image data is required for reverse regeneration which is istructed.

Accordingly, it is unnecessary to repeatedly access to the optical disc 1 to regenerate the image data necessary for decoding in reverse regeneration and therefore reverse regeneration can be smoothly carried out. In addition, the image data before decoding is stored in the ring buffer 5 and the capacity cannot be so large, thereby minimizing large-sized and expensive configuration of the apparatus.

BRIEF DESCRIPTION OF THE DRAWINGS

FIG. 1 including

FIG. 4 including

FIG. 5 including FIG. 5A–5F is a diagram illustrating the changeover state of the switches SW1 and SW2, the contents of storage of the frame memories 16a to 16c and the displayed image of the display 8 when regeneration is changed over from a normal regeneration state to a reverse regeneration state;

FIG. 7 including

FIG. 9 including FIG. 9A–9B is a block diagram of a prior art optical disc apparatus for regenerating image data;

FIG. 11 including

DETAILED DESCRIPTION OF THE PREFERRED EMBODIMENTS

Figure 1A:
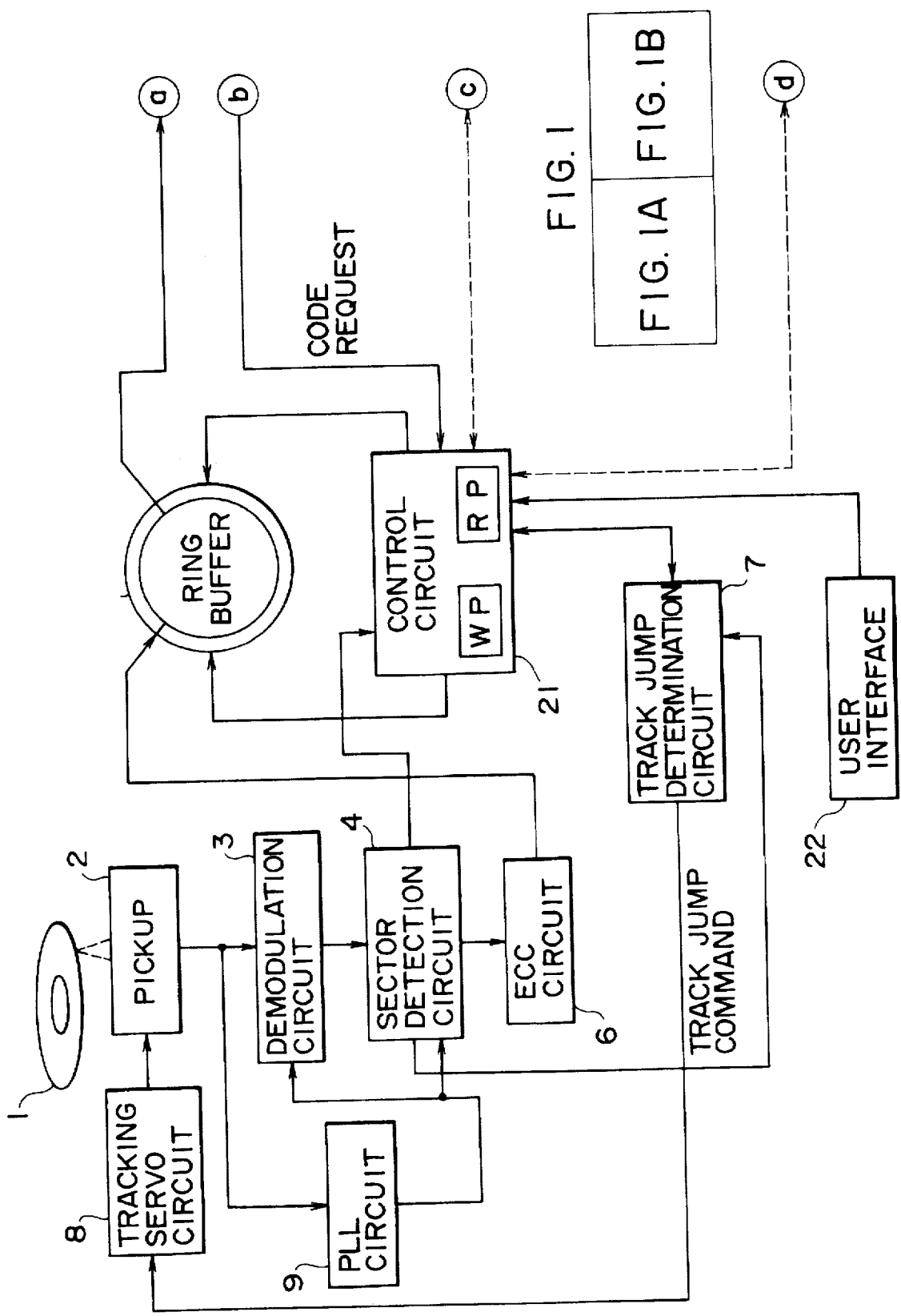
FIG. 1A–1B is a block diagram showing a configuration of an embodiment of an optical disc apparatus to which the present invention applies.
Figure 1B:
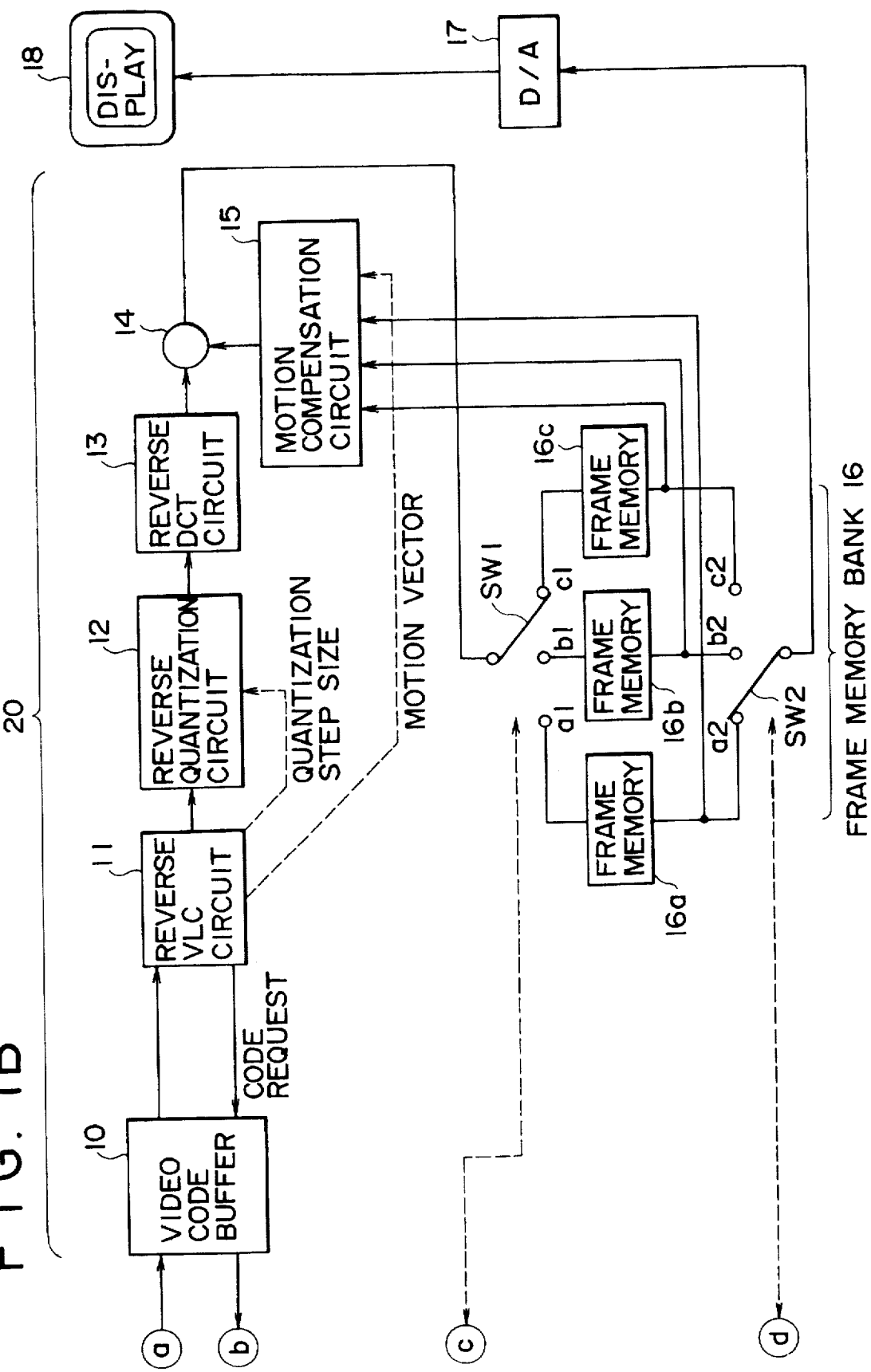
Figure 9B:
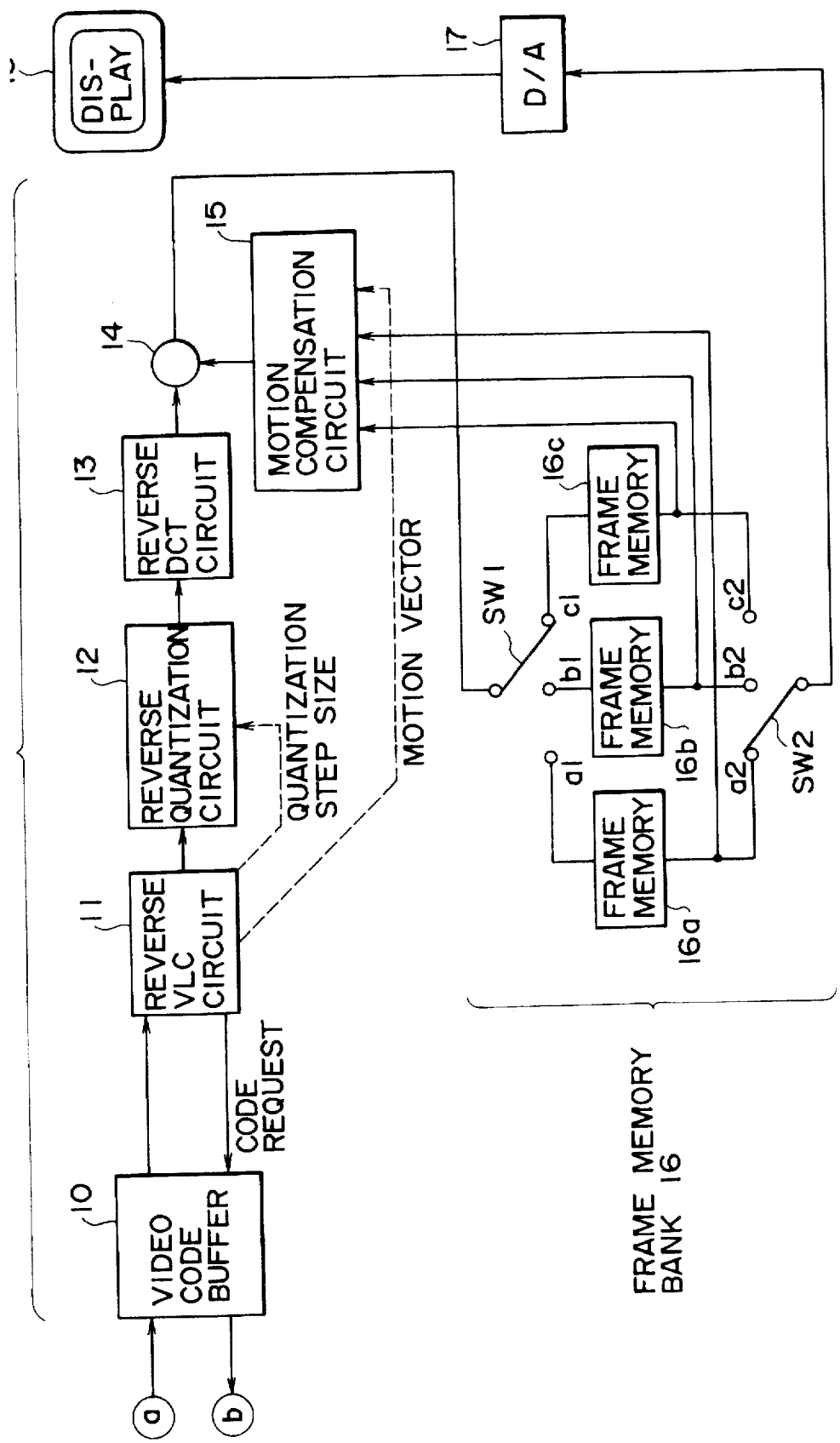

FIG. 1 shows a configuration of an embodiment of an optical disc apparatus to which the present invention applies. In FIG. 1, the parts corresponding to those shown in FIG. 9 are given the same reference numerals. Specifically, this optical disc apparatus is constructed as same as the optical disc apparatus shown in FIG. 9 except that the optical disc apparatus is provided with a control circuit 21 or a ring buffer 5 instead of a control circuit 31 or a ring buffer 100 and further with a user interface 22.

The user interface 22 is operated when the optical disc is normally regenerated (forward regeneration) or for special regeneration such as, for example, reverse regeneration. The user interface 22 is adapted to output an operation signal corresponding to the above operation to the control circuit 21.

The ring buffer 5 has a capacity of, for example, two GOPs or over. The control circuit 21 has the same functions as the control circuit 31 shown in FIG. 9 and, moreover, makes the ring buffer 5 store the image data regenerated from the optical disc 1 in terms of, for example, one GOP in the ring buffer 5. In this case, the image data regenerated from the optical disc 1 is stored in the ring buffer 5 so that the image data in terms of one GOP which is the image data already stored in the ring buffer 5 and being decoded by the decoding part 20 is not superposed with the image data to be stored. In addition, the control circuit 21 is adapted to read out the image data necessary for reverse regeneration stored in the ring buffer 5 and supply the image data to the decoding part 20 (video code buffer 10) when the control circuit 21 receives an operation signal for commanding reverse regeneration from the user interface 22. The control circuit 21 is also adapted to control the changeover of switches SW1 and SW2 of the frame memory bank 16.

The operation of the control circuit 21 is described below. In normal regeneration, the image data is regenerated and decoded and the resultant decoded image is displayed on the display 18 as in case of the description in FIG. 9 except that the control circuit 21 controls the write point (WP) to store the image data of one GOP in the ring buffer 5 and hold the image data stored in the ring buffer 5 until decoding and display of all image data of one GOP are finished.

In other words, it assumed that the time series GOP is referred to as GOP (i) (where, i is an integer and, for example, GOP (i−1) or GOP (i+1) means the immediately preceding GOP or following GOP to GOP (i) in timing) and the GOP including the image data being displayed on the display 18 is referred to as a current GOP.

Figure 2:
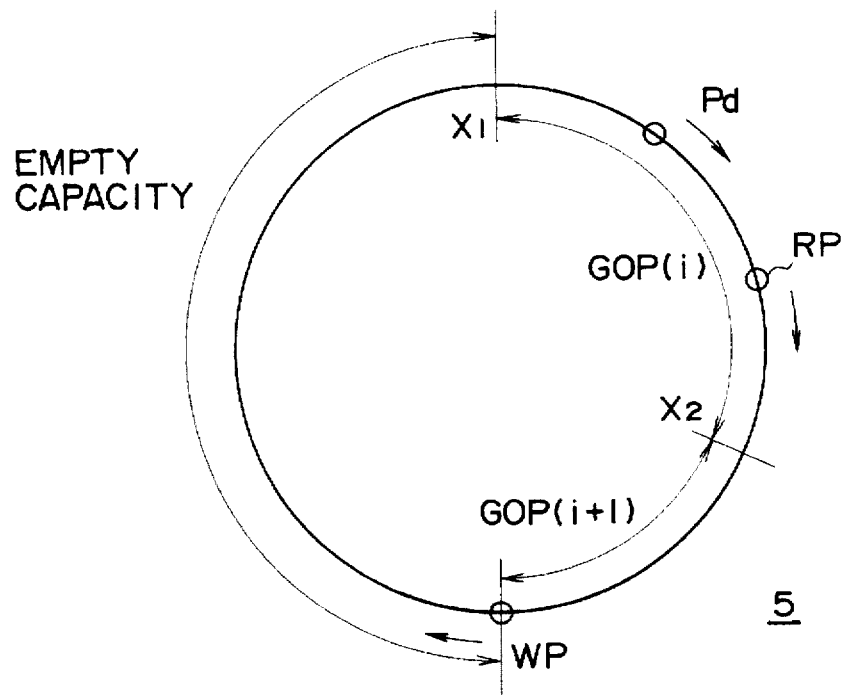
FIG. 2 is an illustration for describing read and write control of image data for the ring buffer 5 in normal regeneration.
Figure 10:
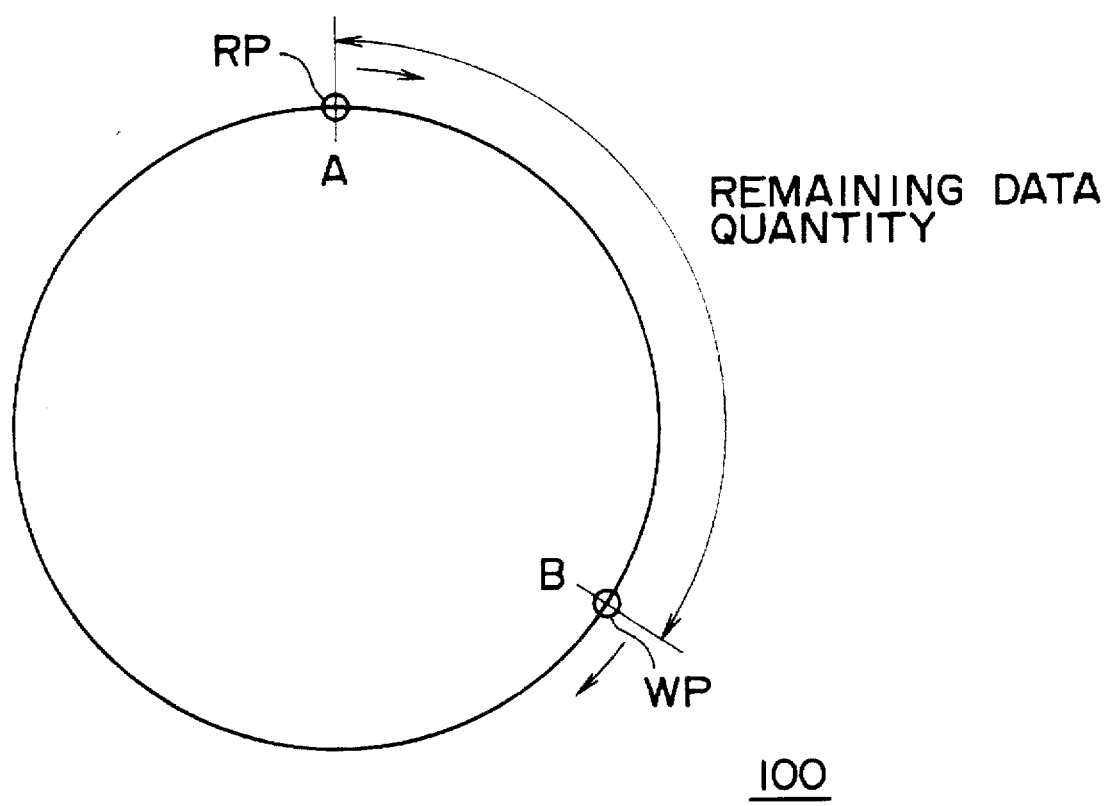
FIG. 10 is a diagram illustrating the read and write control of the image data for the ring buffer 100 shown in FIG. 9.

When the current GOP, which is GOP (i), for example, is stored in the range of addresses X1 and X2 in ring buffer 5 shown in FIG. 2 (or FIGS. 3 and 6 described later) corresponding to FIG. 10 mentioned above, the optical disc apparatus carries out the control so that the write point (WP) does not catch up the address X1 which is the address of the first image data of the GOP (i).

In FIG. 9 as described in FIG. 10, though, if the current GOP is GOP (i) and stored in a range of address X1 to address X2 on the ring buffer 5 shown in FIG. 2 (same with FIGS. 3 and 6 described later) corresponding to FIG. 10, the track jump control is the write point is controlled so that the write point does not catch up address X1 of the leading image address of GOP (i), this optical disc apparatus carries out the track jump control so that the write point doe not catch up the address X1.

In doing so, the regenerate point (RP) passes through the address X2 and all image data which forms GOP (i) is kept stored in the ring buffer 5 until decoding and displaying of the following GOP (i+1) are started after decoding and displaying of GOP (i).

After the display of GOP (i) which is the current GOP has been finished, GOP (i+1) which is subsequently written serves as the current GOP and the leading address is address X2.

In FIG. 2, an area from the write point (RP) clockwise to the address X1 is an empty capacity of the ring buffer 5. In FIG. 2, Pb is denotes an address of image data displayed on the display 18 (hereinafter appropriately referred to as "display point"). Relative positions of this display point (Pb) and the regenerate point (RP) are determined depending on the delay of the video code buffer 10 and a difference between the decoding sequence (recording sequence) and the display sequence of the image data as described above. Therefore these relative positions are not always fixed.

When the user interface 22 is operated and the operation signal for commanding reverse regeneration is received by the control circuit 21 during normal regeneration, the control circuit 21 identifies the image data displayed on the display 18 in accordance with the changeover status of the switch SW2 controlled by the control circuit 21. The control circuit 21 controls the switch SW2 to maintain the current changeover state and supply the image data displayed on the display 18 from the frame memory bank 16 (one of frame memories 16a to 16c) to the display 18 through the D/A converter 17. Consequently, the display 18 displays a still image.

The control circuit 21 controls the tracking servo circuit 8 through the track jump determination circuit 7 and shifts (track jump) the pickup 2 to the leading position of the immediately preceding GOP (recorded immediately before the current GOP in the optical disc 1) to the current GOP of the optical disc 1. Information indicating the leading position of the GOP is recorded in the header part of GOP and the track jump control is carried out by detecting this information in the sector detection circuit 4. If, for example, the current GOP is GOP (i), regeneration of image data is started by the pickup 2 from the header of the GOP (i−1).

Figure 3:
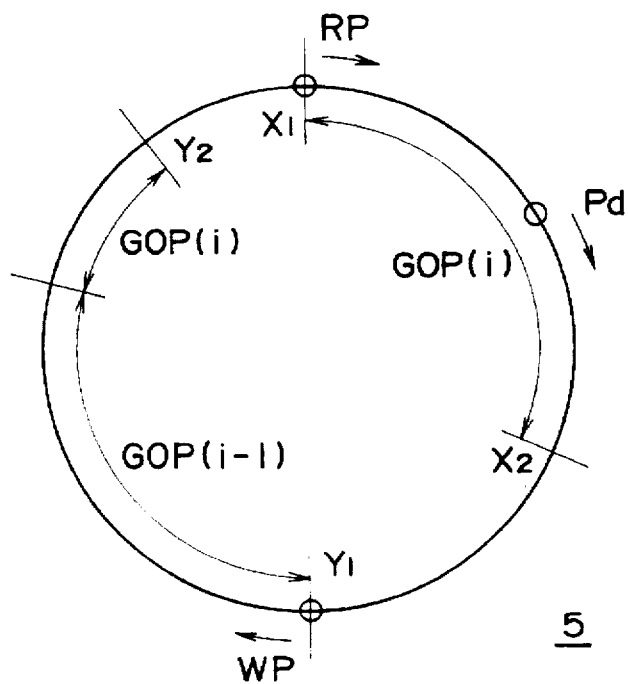
FIG. 3 is a diagram for describing read and write control of the image data for the ring buffer 5 in reverse regeneration.

In addition, the control circuit 21 abandons GOP (GOP (i+1) i FIG. 2) written after the current GOP (i) of the ring buffer 5, and makes the write point (WP) jump to address Y1 as shown in FIG. 3 and the data of GOP (i−1), which is regenerated by the pickup 2, to be written.

In this case, address Y1 is, for example, at a remotest position from the address X1, an opposing position to the address X1 with the center of circle therebetween. The capacity of the ring buffer 5 is 2GOP or over and the capacity from the address X1 to the address Y1 is 1GOP or over. In reverse regeneration, the write start address is fixed at X1 or Y1 and write operation is alternately repeated.

In this case, data from the address Y1 to an address immediately before, for example, the first picture of GOP (i−1) and following GOP (i) is written in the ring buffer 5 as shown in FIG. 3. Address Y2 is an address of image data immediately before of the first P picture of GOP(i) written following GOP (i−1).

Figure 4A:
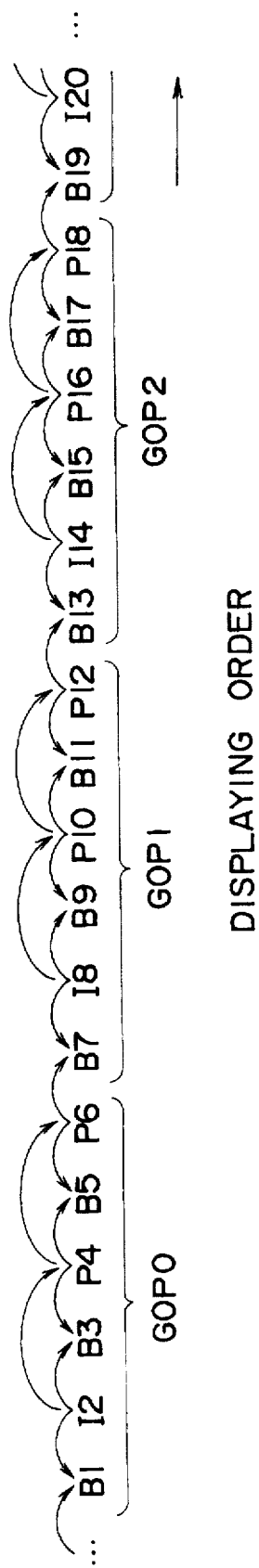
FIG. 4A–4B is a diagram showing a recording sequence (decoding)and a displaying sequence of the image data in the optical disc 1.
Figure 4B:
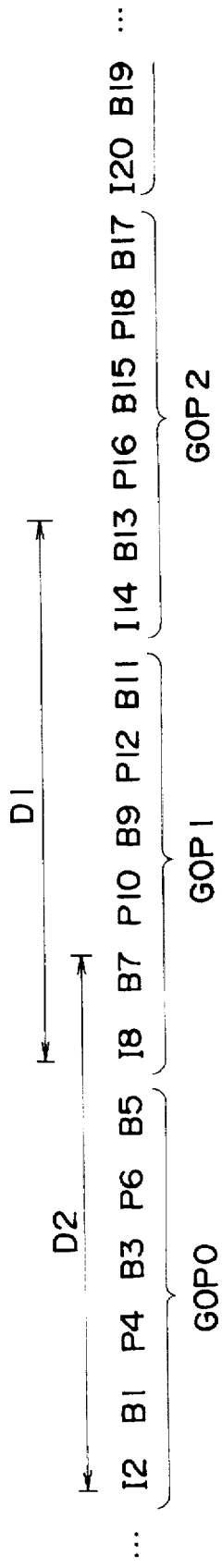
Figure 11A:
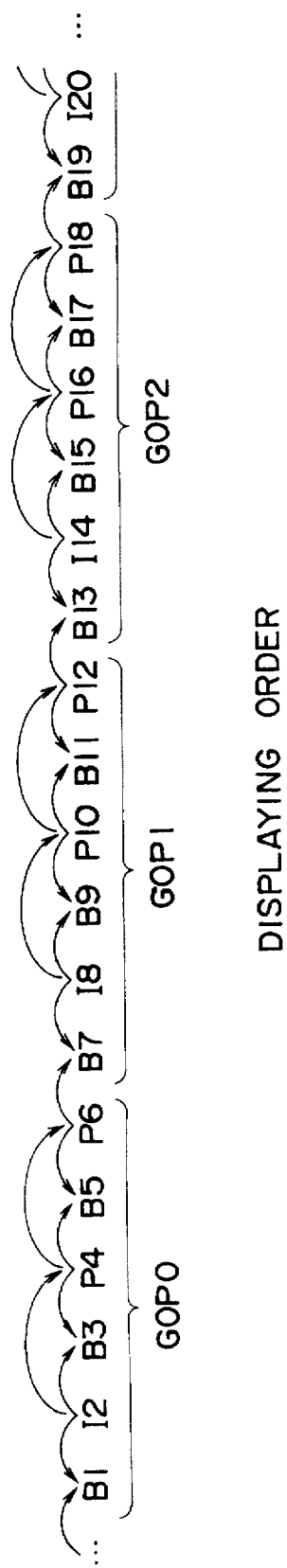
FIG. 11A–11B is a diagram showing the recording sequence (decoding) and the displaying sequence of the image data in the optical disc 1 shown in FIG. 9.
Figure 11B:
Figure 12A:
FIG. 12 including FIG. 12A–12F a diagram illustrating the changeover state of the switches SW1 and SW2, the contents of storage of the frame memories 16a to 16c and the displayed image of the display 8 when the optical apparatus shown in FIG. 9 regenerates the image data from the optical disc 1.
Figure 12B:
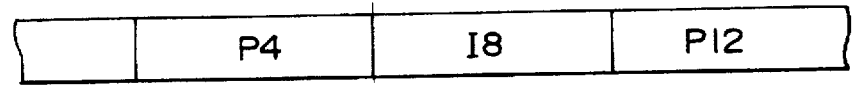
Figure 12C:
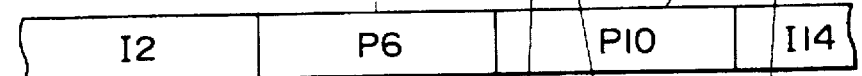
Figure 12D:
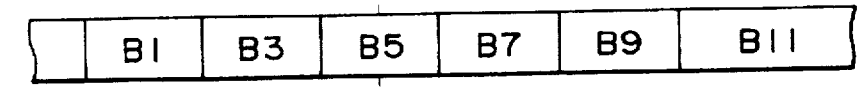
Figure 12E:
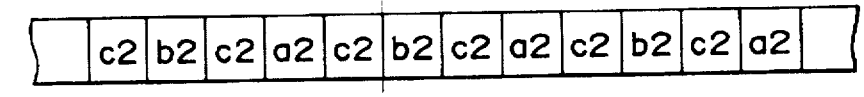
Figure 12F:
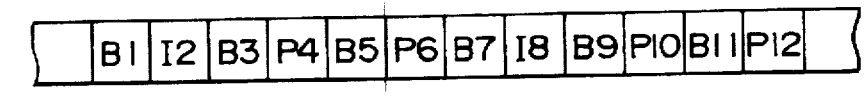

Specifically, if it is assumed that the sequence of the image data recorded in the optical disc 1 is as shown in FIG. 4 (FIG. 4B) similar to FIG. 11 and GOP (i−1) is GOP1, I8, B7, P10, B9, P12, B11, and I14 and B13 (B13 is the data immediately before the first P picture (P16) of GOP (i)) which form GOP2 recorded next are stored in addresses Y1 to Y2 of the ring buffer 5 shown in FIG. 3.

In this case, I14 and B13 of GOP2 are stored with the image data of GOP1 in the ring buffer 5 for a reason why B13 which forms the GOP cannot be decoded only with the data of GOP2 (i)) of GOP2 already stored in addresses X1 to X2 of the ring buffer 5.

In other words, as shown in FIG. 4A showing the displaying sequence of the image data, P12 of the preceding GOP1 as well as I14 of GOP2 are required to decode B13 of GOP2.

It is adapted to store I14 and B13 of GOP2 with the image data of GOP1 in the ring buffer 5 so that P12 and I14 necessary for decoding B13 can be obtained together with B13 by reading the image data stored in address Y1 to Y2 in sequence from the address Y1.

Whenever B13 is to be decoded even in normal regeneration or reverse regeneration, writing of I14 in the ring buffer 5 is not always necessary since I14 has already been decoded and stored in the frame memory bank 16. When there is no allowance in the empty capacity of the ring buffer 5, data of I14 is not written following GOP1 and only the data of B13 can be written.

The image data up to immediately before the first P picture of GOP (i−1) and GOP (i) (in the above case, I14 and B13 of GOP1 and GOP2 is stored in the ring buffer 5 and, when the write point (WP) reaches address Y2, write operation on the ring buffer 5 is inhibited. In other words, the write point (WP) halts as indicating the address Y2.

At the same time as the write operation of image data as described above, the control circuit 21 controls the regenerate point (RP), reads the image data necessary for decoding the image data one frame before the image data displayed as being still on the display 18, and outputs the image data to the decoding part 20.

If GOP (i) (current GOP) in FIG. 3 is, for example, GOP2, the control circuit 21 reads the data, which is necessary for decoding the image data one frame before the image data currently displayed on the display 18, of image data I14, B13, P16, B15, P18 and B17 (FIG. 4B), outputs the image data to the decoding part 20 and decoded therein. Similarly, the image data of the current GOP necessary for displaying the image data of the frame which forms the current GOP in reverse timing (an sequence reverse to the displaying sequence (a direction shown with the arrow in the drawing shown in FIG. 4A) is repeatedly read from the ring buffer 5 and decoded whereby reverse regeneration is carried out.

When decoding of the image data, which can be decoded by using only the I picture, of image data of the current GOP, that is, decoding of P16 of GOP2 (GOP (i)) is finished, the regenerate point (RP) is shifted to address Y1 shown in FIG. 3 and consequently GOP2 (part of GOP (i)) and GOP1 (GOP (i−1) stored in address Y1 to Y2 are similarly decoded.

Simultaneously, the control circuit 21 controls the tracking servo circuit 8 through the track jump determination circuit 7, shifts the pickup 2 to the header of GOP (i−2) recorded immediately before GOP (i−1) on the optical disc 1 and regenerates the image data therefrom. In this case, the write point (WP) is shifted to the address X1 shown in FIG. 3 and the image data of GOP (i−2) and the image data up to immediately before the first P picture of GOP (i−1) recorded following GOP (i−2) are stored in the ring buffer 5.

Subsequently, similar operation is repeated and reverse regeneration is carried out.

FIG. 5 shows the changeover status of switches SW1 and SW2 in the optical disc apparatus shown in FIG. 1, the contents stored in the frame memories 16a to 16c and the displayed image of the display 18 in the time series in the case that regeneration of the image data in sequence shown in FIG. 4 is changed over from normal regeneration to reverse regeneration. FIGS. 5A to 5F respectively show the selection terminal of the switch SW1, the contents of storage of the memories 16a to 16c, the selection terminal of the switch SW2, and the displayed image of the display 18.

In normal regeneration, it is assumed that, for example, I8 of GOP1 shown in FIG. 4 is decoded and stored in the memory 16a (a part shown with (*1) in FIG. 5B). It is also assumed that reverse regeneration is commanded when the image data up to B13 of GOP2 is decoded and displayed (a part shown with (*2) in FIG. 5F) as in the case shown in FIG. 12.

In this case, the display state of B13 is the still image state. As described above, the image data (I8, B7, P10, B9, P12, B11) of GOP 1 recorded immediately before the current GOP2 and the image data (I14, B13) (a part shown with D1 in FIG. 4B) recorded immediately before the first P picture of the following GOP2 are regenerated and stored in the ring buffer 5.

In this case, P12 of GOP1 need be displayed following B13 of GOP2 in reverse regeneration as shown in FIG. 4A. P10 need be referred for decoding P12 and I8 need be referred for decoding P10.

I8 is read from the ring buffer 5 and decoded in the decoding part 20. In this case, the switch SW1 is changed over to the terminal a1 (part shown with (*3) in FIG. 5A) whereby the decoded I8 is stored in the frame memory 16a (part shown with (*4) in FIG. 5B).

Subsequently, P10 is read from the ring buffer 5 and decoded with I8 stored in the frame memory 16a as the reference image. In this case, the switch SW1 is changed over to the terminal b1 (FIG. 5A) and the decoded P10 is stored in the frame memory 16b (FIG. 5C). After this, P12 is read from the ring buffer 5 and decoded with P10 stored in the frame memory 16b as the reference image. In this case, the switch SW1 is changed over to the terminal c1 (FIG. 5A) whereby the decoded P12 is stored in the frame memory 16c (FIG. 5A).

In this case, the switch SW2 has been changed over to the terminal c2 (part shown with (*5) in FIG. 5E) when the above-described B13 is displayed (part shown with (*2) in FIG. 5F) and the changeover state of the switch SW2 is made to remain as is even after P12 is stored in the frame memory 16c.

Consequently, P12 is read from the frame memory 16c and supplied to the display 18 through the D/A conversion part 17 and displayed thereon (FIG. 5F).

B11 is displayed after P12 has been displayed (FIG. 4A). In other words, B11 is read from the ring buffer 5 and decoded. Though P10 and P12 are required as the reference image for decoding B11 (FIG. 4A), B11 is decoded by directly referring to P10 or P12 which is currently stored in the frame memories 16b or 16c (FIG. 5C, FIG. 5D). In this case, the switch SW1 is changed over to the terminal a1 (FIG. 5A) and the decoded B11 is stored in the frame memory 16a instead of I8 which has been stored (FIG. 5 B).

At the same time, the switch SW2 is changed over to the terminal a2 and B11 is read from the frame memory 16a and supplied to the display 18 through the D/A converter 17 and displayed thereon (FIG. 5F).

In this case, the image data of GOP1 is stored in the ring buffer 5 in the same sequence as the recording sequence in the optical disc 1, that is, in the sequence of I8, B7, P10, B9, P12 and B11. Accordingly, the image data is read in the sequence of I8, B7, P10, B9, P12 and B11. Since B7 and B9 are unnecessary in the above case, the data is not transferred to the following stage and abandoned in the video code buffer 10 even though the data is not read from the ring buffer 5 or is read and supplied to the decoding part 20.

In other words, it is adapted that the B picture unnecessary for decoding the displayed image is not decoded and is abandoned.

After displaying B11, P10 is displayed (FIG. 4A). Though I8 is necessary for decoding P10 (FIG. 4 A), B11 is stored in the frame memory 16a as described above instead of I8 stored when reverse regeneration is started (FIG. 5B).

In this case, I8 is read again from the ring buffer 5 and decoded. The switch 1 is changed over to the terminal b1 (FIG. 5A) and the decoded I8 is stored in the frame memory 16b (part shown with (*6) in FIG. 5C).

Subsequently, P10 is decoded with the decoded I8 as the reference image and further B 9 is decoded with the decoded I8 and P10 as the reference image. The switch SW1 is changed over to terminals c1 and a1 in sequence as shown in FIG. 5A and consequently the decoded P10 and B9 are stored in the frame memory 16c or 16a (FIGS. 5D and 5B).

In addition, the switch SW2 is changed over in sequence to terminals c2 and a2 as shown in FIG. 5E and consequently P10 and B9 are displayed in sequence on the display 18 (FIG. 5F). After displaying B9, the switch SW2 is changed over to the terminal b2 (FIG. 5E) and I8 stored in the frame memory 16b (part shown with (*6) in FIG. 5) is displayed (FIG. 5F).

As described above, when decoding of the image data of the current GOP which can be decoded by using only the I picture, that is, P10 of GOP1 in this case is completed, I8 and B7 (part shown with D2 in FIG. 4B) of GOP0 to be displayed following GOP1 and the following recorded GOP1 are read from the optical disc 1 and stored in the ring buffer 5.

After displaying I8 of GOP1, for similarly displaying B7 of GOP1, P6 of the preceding GOP0 is required. Therefore, after P10 of GOP1 has been read from the ring buffer 5, the regenerate point (RP) is shifted to the position of the header of GOP0 stored in the ring buffer 5 as described above.

Then I2 is read from the ring buffer 5 and decoded. In this case, the switch SW1 is changed over to the terminal a1 (FIG. 5A) and the decoded I2 is stored in the frame memory 16a (part shown with (*7) in FIG. 5B).

Subsequently, P4 and P6 are read in sequence from the ring buffer 5 (as described above, B1, B3 and B5 are not read out (or are skipped) or abandoned), P4 is decoded with the decoded I2 as the reference image, and further P6 is decoded with this decoded P4 as the reference image. In this case, the switch SW1 is changed over in sequence to terminals c1 and a1 as shown in FIG. 5A and the decoded P4 or P6 are stored in the frame memory 16c or 16a (FIG. 5D and 5B).

Since P6 is stored in the frame memory 16a and I8 necessary for decoding B7 of GOP 1 is already stored in the frame memory 16b (part shown with (*6) in FIG. 5C) , B7 stored following GOP0 is read from the ring buffer 5 and decoded with P6 or I8 respectively stored in the frame memory 16a or 16b as the reference image. In this case, the switch SW1 is changed over to the terminal c1 and the decoded B7 is stored in the frame memory 16c (FIG. 5D).

At the same time, the switch SW2 is changed over to the terminal c2 (FIG. 5E)and consequently B7 stored in the frame memory 16c is displayed (FIG. 5F).

Subsequently, similar processing as in the case that GOP1 is reversely regenerated is repeated and GOP0 is reversely regenerated in the sequence of P6, B5, P4, B3, I2 and B1.

In reverse regeneration, read operation from the I picture recorded in the header of GOP is repeatedly carried out as described above. Accordingly, in reverse regeneration, the display is executed at a speed slower than in normal regeneration except a special case where, for example, the decoding part 20 is adapted so as to carry out decoding at a higher speed than in normal regeneration. FIG. 5 (same with FIG. 7 described later) shows reverse regeneration to be carried out at a speed as fast as ⅓ of the speed in normal regeneration.

The following describes the operation when regeneration is changed over from reverse regeneration to normal regeneration. In reverse regeneration, when the user interface 22 is operated and an operation signal which indicates normal regeneration is received by the control circuit 21 in the case that the regenerate point (RP) stays at the position of address X3 as shown, for example, in FIG. 6 and certain image data which comprises GOP (i) is displayed, the write point (RP) is shifted to address Y1 as described above and the image data of GOP (i−1) is written in sequence in the ring buffer 5.

When the control circuit 21 receives the operation signal which indicates normal regeneration, the control circuit 21 stops write operation of GOP (i−1) on the ring buffer 5 and returns the write point (WP) to address Y1. In addition, the control circuit 21 supplies a track jump command to the tracking servo circuit 8 through the track jump determination circuit 7 and shifts the pickup 2 to the header of GOP (i+1) recorded immediately after the current GOP (i). Consequently, the image data is regenerated from the optical disc 1 in the sequence of GOP (i+1), GOP (i+2), . . . and the image data is written on the ring buffer 5 as described in FIG. 2.

At the same time, the control circuit 21 shifts the regenerate point (RP) in a clockwise direction from address X3 and the image data of GOP (i) is read from the ring buffer 5 and decoded in the decoding part 20. Therefore, after normal regeneration has been commanded , the image obtained by normally regenerating GOP (i) is displayed on the display 18.

When read operation of all image data of GOP (i) is completed with decoding, that is, the regenerate point (RP) is shifted to the position of address X2, the control circuit 21 shifts the regenerate point (RP) to address Y1. Subsequently, the regenerate point (RP) is shifted in the clockwise direction and normal regeneration is carried out in the sequence of GOP (i+1), GOP (i+2), . . . .

The following describes the changeover states of switches SW1 and SW2 in the optical disc apparatus shown in FIG. 1, the contents of storage of frame memories 16a to 16c and the displayed image of the display 18 when normal regeneration is commanded while, for example, B9 is displayed in the reverse regeneration described, for example, in FIG. 5, referring to FIG. 7. FIGS. 7A to 7F respectively show the selection terminal; of SW1, the contents of storage of memories 16a to 16c, the selection terminal of SW2 and the displayed image of the display 18.

When the normal regeneration is commanded while the reverse regeneration is carried out and B9 is displayed, P10 need be displayed next (FIG. 4A).

Figure 7A:
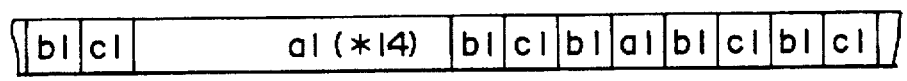
FIG. 7A–7F is a diagram illustrating the changeover state of the switches SW1 and SW2, the contents of storage of the frame memories 16a to 16c and the displayed image of the display 8 when regeneration is changed over from the reverse regeneration state to the normal regeneration state.
Figure 7B:
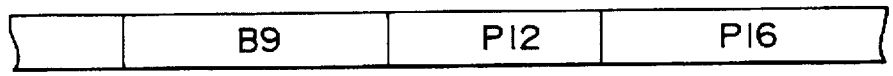
Figure 7C:
Figure 7D:
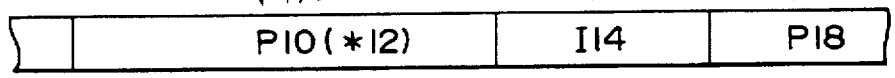
Figure 7E:
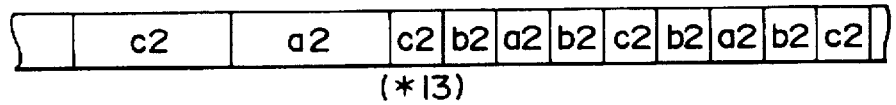
Figure 7F:
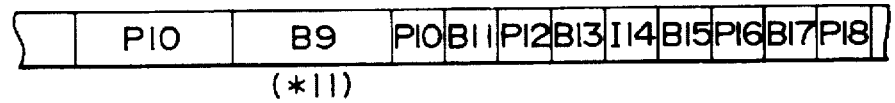

Since P10 used as the reference image is stored in the frame memory 16c (part shown with (*12) in FIG. 7D) under the condition that B9 is displayed (part shown with (*11) in FIG. 7F) in the reverse regeneration, the switch SW2 is changed over to the terminal c2 (part shown with (*13) in FIG. 7E) and P10 stored in the frame memory 16c is supplied to the display 18 through the D/A converter 17 and displayed thereon.

After displaying P10, B11 is displayed. In other words, B11 is read from the ring buffer 5 and decoded. Though P10 and P12 need be used as the reference image for decoding this B11 (FIG. 4A), P10 is stored in the frame memory 16c in this case as described above and therefore only P12 is read from the ring buffer 5 and decoded before B11 is read. This P12 is decoded with P10 stored in the frame memory 16c as the reference image.

In this case, the switch SW1 is remains in the state that the terminal a1 is selected (part shown with (*14) in FIG. 7A) and P12 thereby decoded is stored in the frame memory 16a (FIG. 7B).

B11 is read from the ring buffer 5 and decoded with P12 or P10 respectively stored in the frame memory 16a or 16c as the reference image. In this case, the switch SW1 is changed over to the terminal b1 (FIG. 5 (a)) and B11 thereby decoded is stored in the frame memory 16b (FIG. 5C).

At the same time the switch SW2 is changed over to the terminal b2 (FIG. 7E) and B11 is read from the frame memory 16b and displayed on the display 18 (FIG. 7F).

Subsequently, the switch SW2 is changed over to the terminal a2 (FIG. 7E) and P12 is read from the frame memory 16a and displayed (FIG. 7F).

Figure 6:
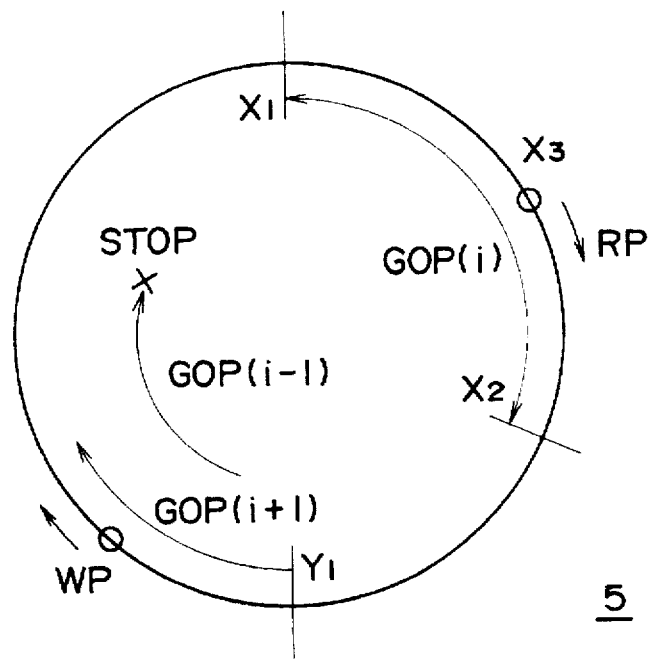
FIG. 6 is a diagram illustrating the read and write control of the image data for the ring buffer 5 when regeneration is changed over from a normal regeneration state to a reverse regeneration state.

As described in FIG. 6, GOP2 recorded following B11 in the optical disc 1 is written in sequence from address Y1 of the ring buffer 5 while the above-described normal regeneration display is executed.

When the display of P12, that is, all the display of the image of GOP1 is completed, the control circuit 21 shifts the regenerate point (RP) to the header of the storing position of GOP2 of the ring buffer 5, that is, address Y1 shown in FIG. 6.

The leading data of GOP1, that is, I14 is read from the ring buffer 5, the switch SW1 is changed over to the terminal c1 (FIG. 7A) and I14 thereby decoded is stored in the frame memory 16c (FIG. 7D).

Subsequently, the image data is read from the ring buffer 5 in the sequence of B13, P16, B15, P18 and B17, switches SW1 and SW2 are changed over as shown in FIG. 7, the contents of storage of the frame memories 16a to 16c change and the image data is displayed in the sequence of B13, I14, B15, P16, B17 and P18.

The following GOP is similarly processed and normal regeneration is executed.

Since it is adapted that, in the case that the image data is stored in the ring buffer 5 in terms of GOP comprising frames necessary for decoding and reverse regeneration is commanded as described above, the required image data of one GOP (for example, I picture) is repeatedly read, the optical disc 1 need not be repeatedly accessed to regenerate the image data necessary for decoding in the reverse regeneration and the reverse regeneration can be more smoothly carried out. In addition, the image data before decoding is stored in the ring buffer 5 and therefore the capacity of the ring buffer 5 need not be so large and large-sized and expensive configuration can be minimized.

In addition, in the above case, it is adapted that the ring buffer 5 is divided into two parts so that read operation of GOP to be displayed from one of the divided two parts and write operation of GP to be displayed next on the other part are alternately repeated, that is, GOP (i−1) recorded immediately before GOP (i) on the optical disc 1 is stored in the ring buffer 5 so that the image data is not written over the current GOP, for example, GOP (i) which is already stored in the ring buffer 5 when the reverse regeneration is commanded, it is not necessary to wait for regenerating GOP to be displayed next from the optical disc 1 and writing on the ring buffer 5 and therefore smooth and quick reverse regeneration can be carried out.

Though the above has described the present invention applied to the optical disc apparatus for regenerating the image data from the optical disc 1, the present invention is applicable to, for example, an optical magnetic disc, other disc type recording media or an apparatus for regenerating the image data from a tape type recording medium.

In addition, the present invention is applicable to a recording medium on which not only the image data but also both the image data and the audio data are recorded.

Though the ring buffer 5 has a storage capacity for at least two GOPs in this embodiment, a ring buffer 5 which has a capacity less than two GOPs, for example, more than one GOP.

In this case, in the reverse regeneration, the image data of one GOP stored on the ring buffer 5 is repeatedly read as required and decoded as described above. After the display of GOP has been completed, the following GOP (in this case, a timing-preceding GOP because the reverse regeneration is carried out) can be regenerated from the optical disc 1 and decoding of a new GOP can be started after GOP is written on the ring buffer 5.

Figure 8:
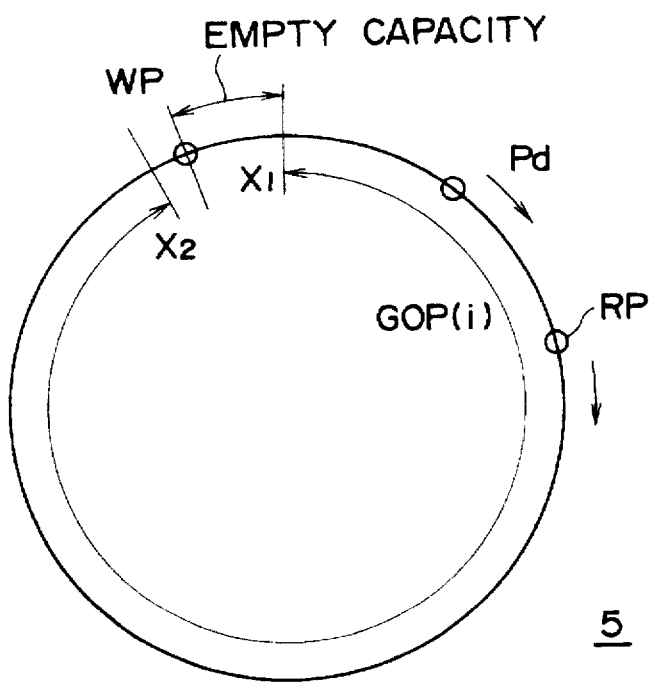
FIG. 8 is a diagram illustrating the read and write control of the image data for the ring buffer the capacity of which is one GOP.

Specifically, if the current GOP is, for example, GOP (i) and this GOP (i) is stored on the ring buffer 5 having a capacity slightly larger than one GOP as shown in FIG. 8, the image data of GOP (i) is read as required as described above and reversely regenerated when the reverse regeneration is commanded.

After the I picture of GOP (i) has been decoded and displayed, the control circuit 21 controls the tracking servo circuit 8 through the track jump determination circuit 7 and shifts the pickup 2 to the recording position at the header of GOP (i−1) on the optical disc 1. The write point (WP) shifted to address X1 and the data of GOP (i−1) regenerated by the pickup 2 is written from the address X1.

When this write operation is completed, the regenerate point (RP) is shifted to address X1 and the image data of GOP (i−1) is read from the ring buffer 5 and reversely regenerated as required.

In this case, however, the decoding is interrupted during regeneration of the next GOP write operation on the ring buffer 5 and, therefore, compared with conventional repetitive regeneration of the pictures (frames) necessary for decoding of the GOP including the pictures in each decoding from the optical disc 1, the number of times of accesses to the optical disc 1 by the pickup 2 can be reduced and quick reverse regeneration can be carried out even though smoothness of regeneration is slightly inferior to that in the case that it is assumed that the ring buffer 5 has a capacity for at least two GOPs.

In this embodiment, the position (address) where the header of GOP in the ring buffer 5 varies with the state of storage (position where the current GOP is stored), for example, the above-described addresses X1 and Y1 (FIGS. 3 and 6) can be fixed at the specified addresses and the position where the header of GOP is written can be fixed on the ring buffer 5. In this case, for example, in normal regeneration, the regenerate point (RP) is shifted to address Y1 when GOP stored is read from address X1, and consequently reading of the next GOP is started. When reading of this GOP is completed, the regenerate point (RP) is shifted to address X1 and subsequently reading of data is similarly repeated.

In addition, though reverse regeneration of all pictures (I, P and B) is described in this embodiment, for example, B picture is not regenerated and reverse regeneration for regenerating only I and P pictures can be carried out. This can be implemented by preventing, for example, B picture from being regenerated from the optical disc 1 or inhibiting decoding of B picture even though the B picture is regenerated, that is, by regenerating only I and P pictures from the optical disc and storing and decoding these pictures. Regeneration can be simultaneously carried out not only as reverse regeneration but also as normal regeneration. In this case, the regeneration speed can be improved as compared with the regeneration of all pictures.

Normal/reverse regeneration of only I picture can also be carried out by regenerating only the I picture from the optical disc 1 without regenerating P and B pictures, and writing it on the ring buffer 5.

In addition, though the case that reverse regeneration is carried out at a speed as fast as ⅓ of normal regeneration is described in this embodiment, the regeneration display speed in the reverse regeneration can be, for example, ¼ or ⅕ in normal regeneration. Otherwise, if the processing speed of the apparatus can be increased, reverse regeneration can be carried out at a speed faster than described above. Furthermore, frame-by-frame scrolling in the reverse direction can be carried out. The mode of regeneration can be determined by operating the user interface 22 to supply an instruction to the apparatus.

Though, in this embodiment, the image data for two GOPs, that is, GOP to be displayed on the display 18 and GOP regenerated from the optical disc 1 are stored on the ring buffer 5 during decoding and displaying, three or over GOPs can be stored as far as the capacity of the ring buffer 5 permits and the image data can be read in response to the direction of regeneration (forward direction or reverse direction) and displayed. In this case, smoother regeneration is enabled since there can be an allowance in the data quantity for the image data (image data to be decoded and displayed) which is stored from the regenerate point (RP) to the write point (WP) in the clockwise direction. In other words, even though it takes a certain longer time to read the object image data from the optical disc 1 after track jump, there is an allowance in the quantity of the image data stored in the ring buffer 5 and therefore the image can be continuously displayed without interruption of the image.

Though, in this embodiment, the image data is stored on the ring buffer 5 in terms of one GOP, the present invention is not limited to this. In other words, the image data should be stored in a specified plural number of frames necessary for the decoding part 20 as a unit.

In addition, though one GOP in this embodiment is structured as shown in FIG. 4, the structure of the other image data can be one GOP.

Though the rules for changing over the switches SW1 and SW2 by the control circuit 21 has not been described in this embodiment, the terminals to which the switches SW1 and SW2 are to be changed over are determined by the control circuit 21 in accordance with the structure of GOP, the reference image used for generating the motion vector in coding the image stored on the optical disc 1, or on which of frame memories 16a to 16c the I picture decoded in the header of GOP is stored.

As described above, the present invention enables to eliminate repeated access to the recording medium to regenerate the image data which will be necessary for decoding in reverse regeneration and consequently smoother reverse regeneration can be carried out. In addition, reverse regeneration can be carried out, for example, in frame scrolling. The image data before decoding is stored in the storing means and therefore the capacity of the storing means need not be so large and larger-sized and more expensive configuration of the apparatus can be minimized.

What is claimed is:

1. A data regenerating apparatus for regenerating coded image data from a recording medium, comprising regenerating means for regenerating coded image data including a plurality of predictively coded image data;

storing means for storing said coded image data which is regenerated;

decoding means for decoding the coded image data which is read from said storing means;

outputting means for outputting decoded image data according to a regeneration sequence; and control means for carrying out reverse regeneration by selectively re-reading portions of said coded image data as said portions are needed for decoding portions of said predictively coded image data that are designated for reverse regeneration and supplying said re-read coded image data to said decoding means.

2. A data regenerating apparatus according to claim 1, wherein said recording medium is a disc type medium.

3. A data regenerating apparatus according to claim 1, further comprising display control means for maintaining an image which is displayed during operation from operation for reverse regeneration to starting of reverse regeneration.

4. A data regenerating apparatus according to claim 1, wherein said outputting means includes storing means for storing the decoded image data for a plurality of frames.

5. A data regenerating apparatus according to claim 1, further comprising write control means for maintaining the coded image data in said storing means until decoding of all coded image data for one GOP is completed.

6. A data regenerating apparatus according to claim 5, wherein said write control means controls to write the coded image data for one GOP to be decoded next on said storing means until decoding of all coded image data for one GOP is completed.

7. A data regenerating apparatus for regenerating coded image data from a recording medium, comprising regenerating means for regenerating coded image data including a plurality of predictively coded image data;

first storing means for storing said coded image data which is regenerated;

decoding means for decoding the coded image data which is read from said first storing means;

second storing means for storing a plurality of decoded image data;

outputting means for outputting decoded image data from said second storing means according to a regeneration sequence; and control means for carrying out reverse regeneration when said regeneration sequence is a reverse regeneration sequence, said reverse regeneration being carried out by selectively re-reading portions of said coded image data as said portions are needed for decoding portions of said predictively coded image data that are designated for reverse regeneration, and for supplying said re-read coded image data to said decoding means.

8. A data regenerating apparatus according to claim 7, wherein said decoding means comprises a reverse VLC circuit, a reverse quantization circuit, a reverse DCT circuit and a motion compensation circuit.

9. A data regenerating apparatus according to claim 7, wherein said second storing means is formed by a plurality of frame memories.

10. A data regenerating apparatus according to claim 9, wherein said second storing means comprises at least three frame memories.

11. A data regenerating apparatus according to claim 9, further comprising:

first changeover means for selecting one of said plurality of frame memories and supplying decoded image data to the selected frame memory;

second changeover means for selecting and outputting one of image data stored in said plurality of frame memories; and changeover control means for controlling said first and second changeover means so that continuous reverse regeneration images can be obtained.

12. A data regenerating method for regenerating coded image data, comprising the steps of:

regenerating coded image data from a recording medium, said coded image data including predictively coded image data;

storing said coded image data which has been regenerated in a storage means;

reading said coded image data from said storage means and decoding the read coded image data;

outputting decoded image data according to a sequence of regeneration; and when said regeneration sequence is a reverse regeneration sequence, the step of reading said coded image data includes selectively re-reading portions of said coded image data from said storage means as said portions are needed for decoding portions of said predictively coded image data that are designated for reverse regeneration.

13. A data regenerating method according to claim 12, wherein a step for outputting said decoded image data includes a step for maintaining the coded image data until decoding of all coded image data for one GOP is completed.

14. A data regenerating method according to claim 13, wherein a step for storing said decoded image data includes a step for writing the coded image data for one GOP to be next decoded until decoding of all coded image data for one GOP is completed.

15. A data regenerating method for regenerating coded image data from a recording medium, comprising the steps of:

regenerating coded image data including a plurality of predictively coded image data;

storing said coded image data which is regenerated;

reading said coded image data and decoding the read coded image data;

storing a plurality of decoded image data;

reading the stored image data in a sequence of regeneration; and when said sequence of regeneration is a reverse regeneration sequence, the step of reading said coded image data includes selectively re-reading portions of said coded image data as said portions are needed for decoding portions of said predictively coded image data that are designated for reverse regeneration.

16. A data regenerating method according to claim 15 including the steps of:

carrying out reverse variable length coding of the read coded image data;

carrying out reverse quantization of the reversed variable length code according to a quantization step size;

carrying out reverse discrete cosine transform (DCT) processing of the requantized data; and carrying out motion compensation of the reference image data corresponding to a monitor vector; and adding up the reversed DCT data and the motion compensated data.

* * * * *